US012205740B2

United States Patent
Muneishi

(10) Patent No.: US 12,205,740 B2
(45) Date of Patent: Jan. 21, 2025

(54) PLANAR COIL AND TRANSFORMER, WIRELESS ELECTRIC POWER TRANSMISSION DEVICE, AND ELECTROMAGNET THAT INCLUDE IT

(71) Applicant: KYOCERA Corporation, Kyoto (JP)

(72) Inventor: Takeshi Muneishi, Kusatsu (JP)

(73) Assignee: Kyocera Corporation, Kyoto (JP)

( * ) Notice: Subject to any disclaimer, the term of this patent is extended or adjusted under 35 U.S.C. 154(b) by 816 days.

(21) Appl. No.: 17/293,437

(22) PCT Filed: Nov. 25, 2019

(86) PCT No.: PCT/JP2019/045939
§ 371 (c)(1),
(2) Date: May 12, 2021

(87) PCT Pub. No.: WO2020/110987
PCT Pub. Date: Jun. 4, 2020

(65) Prior Publication Data
US 2021/0407720 A1 Dec. 30, 2021

(30) Foreign Application Priority Data
Nov. 28, 2018 (JP) ................................ 2018-222543

(51) Int. Cl.
*H01F 27/28* (2006.01)
*H01B 1/22* (2006.01)
*H01F 17/00* (2006.01)
*H01F 38/14* (2006.01)
*H01F 27/24* (2006.01)

(52) U.S. Cl.
CPC ........... *H01F 17/0006* (2013.01); *H01B 1/22* (2013.01); *H01F 27/2847* (2013.01); *H01F 38/14* (2013.01); *H01F 2017/0073* (2013.01); *H01F 27/24* (2013.01)

(58) Field of Classification Search
CPC .. H01F 17/0006; H01F 27/2847; H01F 38/14; H01F 27/24; H01F 27/2804; H01F 41/043; H01F 2007/068; H01F 5/003; H01B 1/22
See application file for complete search history.

(56) References Cited

U.S. PATENT DOCUMENTS

2002/0092599 A1* 7/2002 Tokuda ................ H03H 7/0115 156/89.12
2003/0011458 A1* 1/2003 Nuytkens ................ H01F 27/36 336/200
2007/0085121 A1* 4/2007 Mikura .................. H05K 1/165 257/295

(Continued)

FOREIGN PATENT DOCUMENTS

JP H4-65011 A 3/1992
JP H05-174613 A 7/1993

(Continued)

*Primary Examiner* — Mang Tin Bik Lian
(74) *Attorney, Agent, or Firm* — Procopio, Cory, Hargreaves & Savitch LLP

(57) ABSTRACT

A planar coil in the present disclosure includes a substrate that is composed of a ceramic(s) and includes a first surface, and a first metal layer that is positioned on the first surface and includes a void.

16 Claims, 6 Drawing Sheets

(56) References Cited

U.S. PATENT DOCUMENTS

| | | | | |
|---|---|---|---|---|
| 2014/0116758 | A1* | 5/2014 | Li | H05K 1/165 174/255 |
| 2015/0102889 | A1* | 4/2015 | Choi | H01F 41/042 336/200 |
| 2016/0254090 | A1* | 9/2016 | Lloyd | H01F 27/2804 336/200 |
| 2017/0287626 | A1* | 10/2017 | Larson | H01F 38/14 |
| 2018/0374778 | A1* | 12/2018 | Ishimine | H01L 23/36 |

FOREIGN PATENT DOCUMENTS

| | | | | |
|---|---|---|---|---|
| JP | H6-151183 | A | | 5/1994 |
| JP | H8-279574 | A | | 10/1996 |
| JP | 2002-280246 | A | | 9/2002 |
| JP | 2004140174 | A | * | 5/2004 |
| JP | 2006-033953 | A | | 2/2006 |
| JP | 2015-207709 | A | | 11/2015 |

* cited by examiner

PLANAR COIL AND TRANSFORMER, WIRELESS ELECTRIC POWER TRANSMISSION DEVICE, AND ELECTROMAGNET THAT INCLUDE IT

CROSS-REFERENCE TO RELATED APPLICATION(S)

This application is a national stage application of International Application No. PCT/JP2019/045939, filed on Nov. 25, 2019, which designates the United States and is incorporated by reference herein in its entirety, and which is based upon and claims the benefit of priority to Japanese Patent Application No. 2018-222543, filed on Nov. 28, 2018, which is incorporated by reference herein in its entirety.

FIELD

The present disclosure relates to a planar coil and a transformer, a wireless electric power transmission device, and an electromagnet that include it.

BACKGROUND

A laminated coil is obtained by preparing a plurality of planar coils where a metal layer with a spiral shape is formed, and laminating them on a substrate with an insulation property.

For example, Patent Literature 1 discloses a laminated coil where a coil pattern is formed on an insulated substrate by electroforming plating.

CITATION LIST

Patent Literature

Patent Literature 1: Japanese Patent Application Publication No. 2006-033953

SUMMARY

A planar coil in the present disclosure has a substrate that is composed of a ceramic(s) and has a first surface, and a first metal layer that is positioned on the first surface and has a void.

DESCRIPTION OF EMBODIMENTS

Hereinafter, a planar coil and a transformer, a wireless electric power transmission device, and an electromagnet that include it, in the present disclosure, will be explained in detail, with reference to the drawings.

Figure 1:
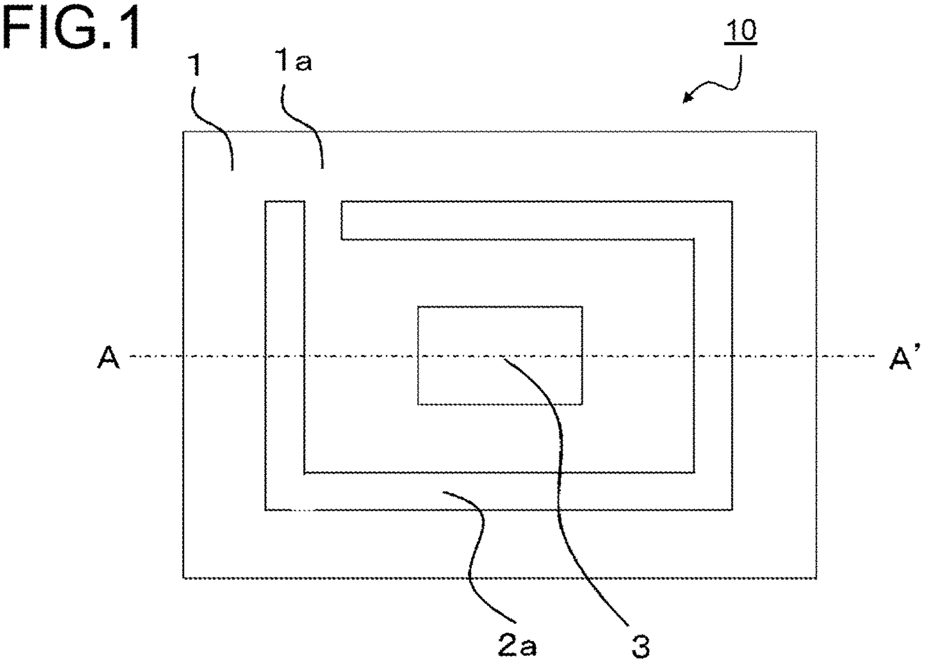
FIG. 1 is a plan view where an example of a planar coil in the present disclosure is viewed from a side of a first surface thereof.
Figure 2:
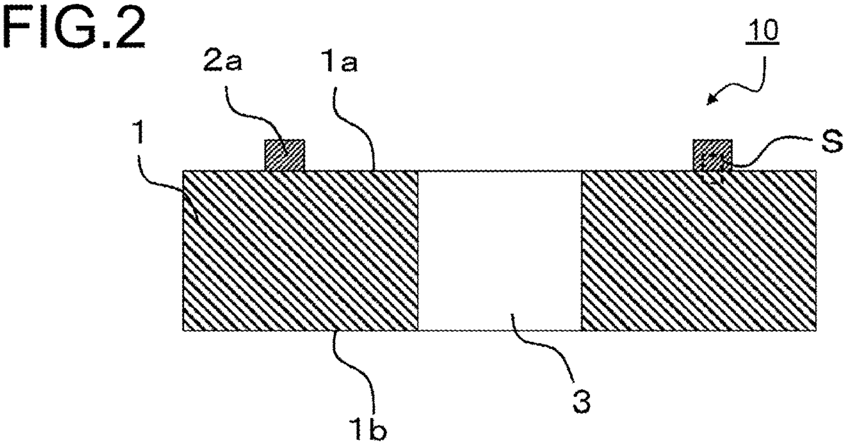
FIG. 2 is an example of a cross-sectional view of FIG. 1 along line A-A' therein.

As illustrated in FIG. 1 and FIG. 2, a planar coil 10 in the present disclosure has a substrate 1 that has a first surface 1*a*. Furthermore, the planar coil 10 includes a first metal layer 2*a* that is positioned on the first surface 1*a*. Furthermore, the first metal layer 2*a* has a plurality of voids 9.

Herein, the substrate 1 in the planar coil 10 in the present disclosure is composed of a ceramic(s). For a ceramic(s), it is possible to provide, for example, an aluminum-oxide-based ceramic(s), a silicon-carbide-based ceramic(s), a cordierite-based ceramic(s), a silicon-nitride-based ceramic(s), an aluminum-nitride-based ceramic(s), a mullite-based ceramic(s), or the like. Herein, if the substrate 1 is composed of an aluminum-oxide-based ceramic(s), it is excellent in processability thereof and is inexpensive.

Herein, for example, an aluminum-oxide-based ceramic(s) contain(s) 70% by mass or more of aluminum oxide among 100% by mass of all components that compose the ceramic(s). Then, it is possible to confirm a material of the substrate 1 in the planar coil 10 in the present disclosure according to an undermentioned method. First, the substrate 1 is measured by using an X-ray diffractometer (XRD) and identification thereof is executed based on an obtained 2θ (where 2θ is a diffraction angle) by using a JCPDS card. Then, quantitative analysis of a contained component(s) is executed by using an X-ray fluorescence analyzer (XRF). Then, for example, if presence of aluminum oxide is confirmed by identification as described above and a content of aluminum oxide ($Al_2O_3$) that is converted from a content of aluminum (Al) that is measured by an XRF is 70% by mass or more, it is an aluminum-oxide-based ceramic(s). Additionally, it is also possible to confirm another/other ceramic(s) according to an identical method.

Furthermore, a thermal expansion coefficient(s) of a ceramic(s) is/are generally about 7.2 ppm for an aluminum-oxide-based ceramic(s), about 3.7 ppm for a silicon-carbide-based ceramic(s), about 1.5 ppm for a cordierite-based ceramic(s), about 2.8 ppm for a silicon-nitride-based ceramic(s), about 4.6 ppm for an aluminum-nitride-based ceramic(s), or about 5.0 ppm for a mullite-based ceramic(s).

Furthermore, as illustrated in FIG. 1, the substrate 1 may be of a plate shape. The substrate 1 may have the first surface 1*a* and a second surface 1*b* that is positioned on an opposite side of the first surface 1*a*. Furthermore, the first metal layer 2*a* may be positioned on the first surface 1*a* of the substrate 1 in any arrangement. Furthermore, although the substrate 1 in FIG. 1 has a through-hole 3 that penetrates from a side of the first surface 1*a* to a side of the second surface 1*b*, the through-hole 3 is not an essential component. Additionally, such a through-hole 3 is a hole for inserting a magnetic material.

Figure 3:
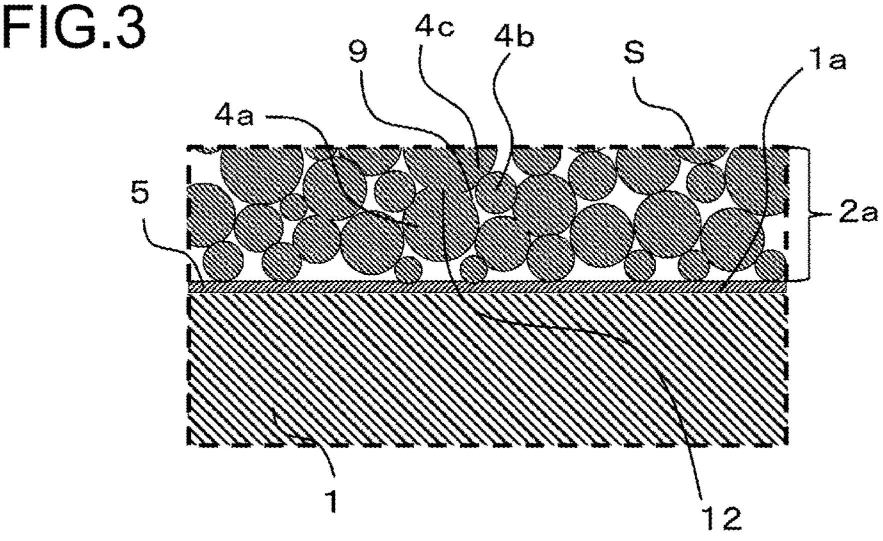
FIG. 3 is an example of an enlarged view of an S part as illustrated in FIG. 2.
Figure 10:
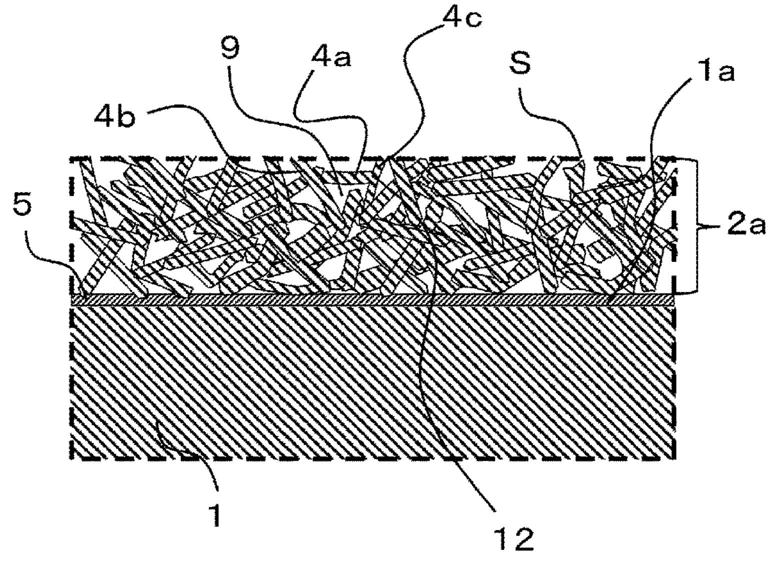
FIG. 10 is an example of an enlarged view of an S part as illustrated in FIG. 2.

As illustrated in FIG. 3 and FIG. 10, a first metal layer 2*a* has a void 9. Hence, a surface area of the first metal layer 2*a* is greater than that of a metal layer where the void 9 is absent. Therefore, a planar coil 10 has a high heat release property.

Furthermore, as illustrated in FIG. 3 and FIG. 10, the first metal layer 2*a* may have a first metal particle 4*a* and a second metal particle 4*b*. The void 9 may be positioned between the first metal particle 4*a* and the second metal particle 4*b*. In a case where such a configuration is possessed thereby, heat that is generated in the first metal particle 4*a* and the second metal particle 4*b* is absorbed by the void 9, so that the planar coil 10 has a high heat release property.

Herein, a material(s) of the first metal particle 4*a* and the second metal particle 4*b* that compose the first metal layer 2*a* may be, for example, a stainless one or copper.

Furthermore, as illustrated in FIG. 3 and FIG. 10, a shape(s) of the first metal particle 4*a* and the second metal particle 4*b* may be, for example, a spherical shape(s), a granular shape(s), a whisker shape(s), or a needle shape(s). In a case where the first metal particle 4*a* and the second metal particle 4*b* are of a whisker shape(s) or a needle shape(s), the first metal particle 4*a* and the second metal particle 4*b* may be bent. The first metal particle 4*a* and the second metal particle 4*b* may have a corner part(s). Furthermore, in a case where the first metal particle 4*a* and the second metal particle 4*b* are of a spherical shape(s) or a granular shape(s), a length(s) of the first metal particle 4*a* and the second metal particle 4*b* in a longitudinal direction(s) thereof may be 0.5 μm or greater and 200 μm or less. In a case where the first metal particle 4*a* and the second metal particle 4*b* are of a whisker shape(s) or a needle shape(s), a diameter(s) thereof may be 1 μm or greater and 100 μm or less, and a length(s) thereof may be 100 μm or greater and 5 mm or less.

In FIG. 3, the first metal particle 4*a* and the second metal particle 4*b* are of granular shapes. In FIG. 10, the first metal particle 4*a* and the second metal particle 4*b* are of whisker shapes. Furthermore, an average thickness of the first metal layer 2*a* may be 1 μm or greater and 5 mm or less.

Furthermore, a porosity of the first metal layer 2*a* may be, for example, 10% or greater and 90% or less. A porosity is provided as an index that indicates a proportion of the void 9 that is occupied in the first metal layer 2*a*. Herein, it is sufficient that a porosity of the first metal layer 2*a* is measured and calculated by using, for example, an Archimedian method.

Furthermore, as illustrated in FIG. 3 and FIG. 10, the first metal layer 2*a* may have a third metal particle 4*c*. The first metal layer 2*a* may have a weld part between the first metal particle 4*a* and the third metal particle 4*c*. The first metal particle 4*a* and the third metal particle 4*c* do not simply contact but are welded, so that heat readily transfers between the first metal particle 4*a* and the third metal particle 4*c*. Hence, the first metal layer 2*a* has a high efficiency of heat conduction as a whole. Therefore, the planar coil 10 has high reliability.

Furthermore, the first metal layer 2*a* in the planar coil 10 in the present disclosure may have a resin between the first metal particle 4*a* and the second metal particle 4*b*. If such a configuration is satisfied, it is possible for a resin to absorb stress at a time when the first metal particle 4*a* and the second metal particle 4*b* expand.

Herein, a resin material may be, for example, a silicone resin. If a resin is a silicone resin, it is elastic as compared with another resin (such as an epoxy resin), so that it is possible to effectively absorb stress at a time when the first metal particle 4*a* and the second metal particle 4*b* expand and a crack is not readily generated in a substrate 1 even over a long period of use.

Furthermore, as illustrated in FIG. 3, the planar coil 10 in the present disclosure may include a bonding layer 5 that is positioned between the first metal layer 2*a* and a first surface 1*a*. If such a configuration is satisfied, the first metal layer 2*a* is not readily released from the substrate 1, and the bonding layer 5 relaxes stress that is generated due to a thermal expansion difference therebetween, so that a crack is not readily generated in the substrate 1. Hence, it is possible to execute a longer period of use. Additionally, an average thickness of the bonding layer 5 may be, for example, 1 μm or greater and 0.5 mm or less.

Furthermore, the bonding layer 5 in the planar coil 10 in the present disclosure may be composed of one that is selected from a resin, a metal, and a glass. Herein, for a resin, it is possible to provide, for example, silicone, imidamide, or the like. For a metal, it is possible to provide, for example, nickel, platinum, copper, or the like. For a glass, it is possible to provide, for example, a borosilicate-type glass, a silicate-type glass, or the like. In a case where the bonding layer 5 includes a material as described above, the first metal layer 2*a* and the substrate 1 are bonded tightly, so that the first metal layer 2*a* is not readily released from the substrate 1.

Herein, if the bonding layer 5 is composed of a glass, stress that is caused by a thermal expansion difference between the first metal layer 2*a* and the substrate 1 is effectively relaxed by the bonding layer 5 because a thermal expansion coefficient of a glass is intermediate between a metal and a ceramic(s), so that a crack is not readily generated in the substrate 1. Moreover, if a specific permittivity of a glass that composes the bonding layer 5 is 2 or greater and 10 or less, it is also possible to relax concentration of electric field.

Alternatively, the bonding layer 5 in the planar coil 10 in the present disclosure may be composed of a porous ceramic(s). Herein, it is sufficient that a porous ceramic(s) is/are, for example, a component(s) that is/are identical to a ceramic(s) that compose(s) the substrate 1. If such a configuration is satisfied, the first metal particle 4*a* and the second metal particle 4*b* that compose the first metal layer 2*a* penetrate into an inside of the bonding layer 5 that is porous, so that the first metal layer 2*a* and the bonding layer 5 are bonded tightly, and both the substrate 1 and the bonding layer 5 are of a ceramic(s), so that the substrate 1 and the bonding layer 5 are bonded tightly. Hence, the first metal layer 2*a* is not readily released from the substrate 1.

Figure 11:
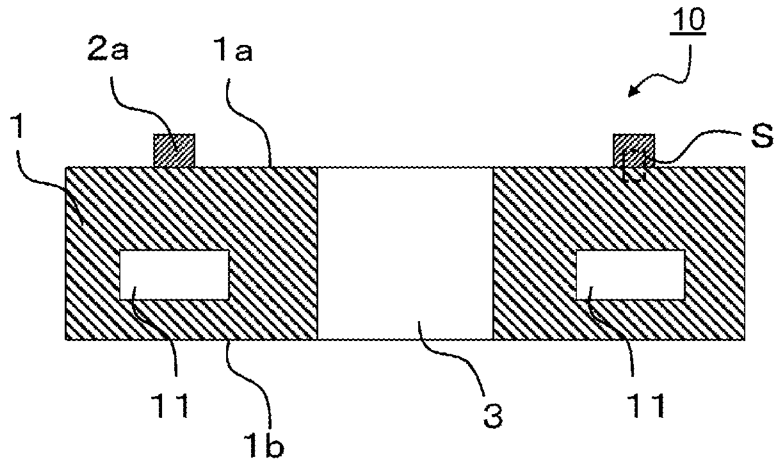
FIG. 11 is an example of a cross-sectional view of FIG. 1 along line A-A' therein.

Furthermore, FIG. 11 is an example of a cross-sectional view of FIG. 1 along line A-A' therein. A substrate 1 in a planar coil 10 in the present disclosure may have a flow channel 11 in an inside thereof. If such a configuration is satisfied, a fluid flows through the flow channel 11 of the substrate 1, so that it is possible to execute temperature adjustment of a first metal layer 2*a*.

Figure 4:
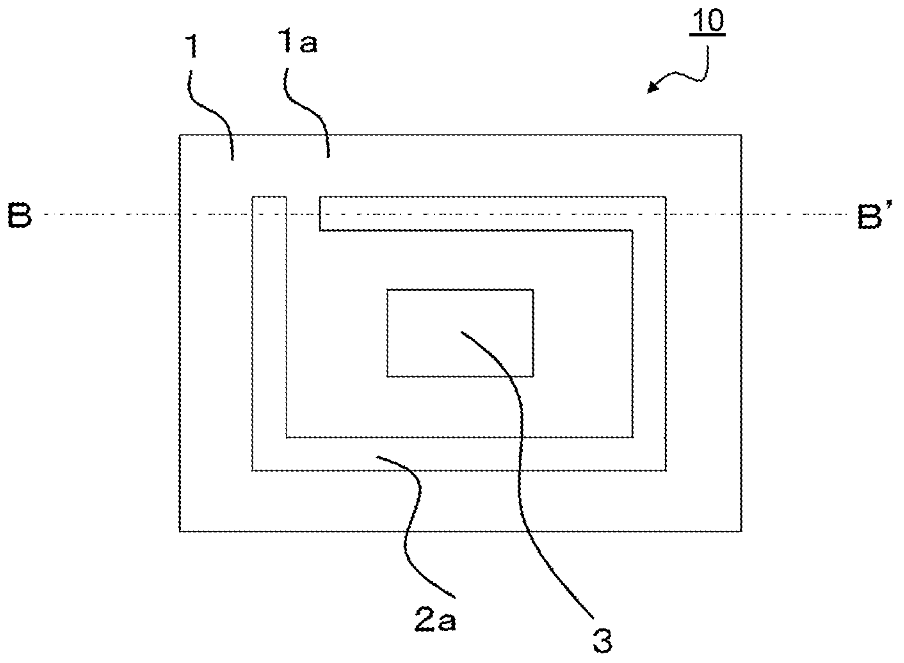
FIG. 4 is a plan view where another example of a planar coil in the present disclosure is viewed from a side of a first surface thereof.
Figure 5:
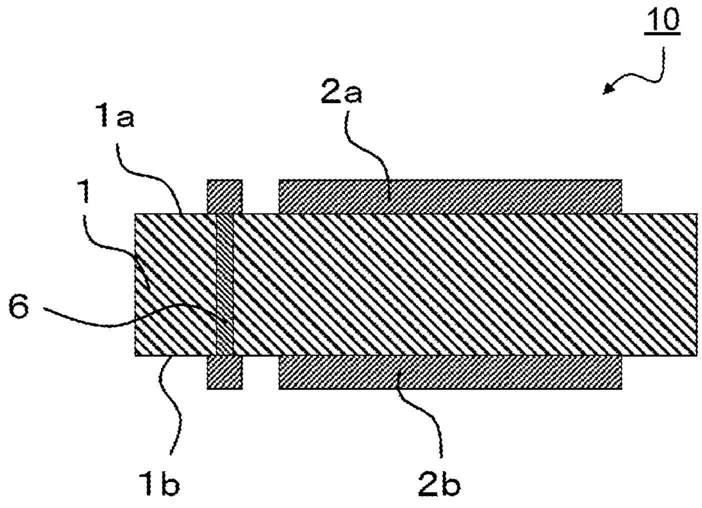
FIG. 5 is a cross-sectional view of FIG. 4 along line B-B' therein.
Figure 6:
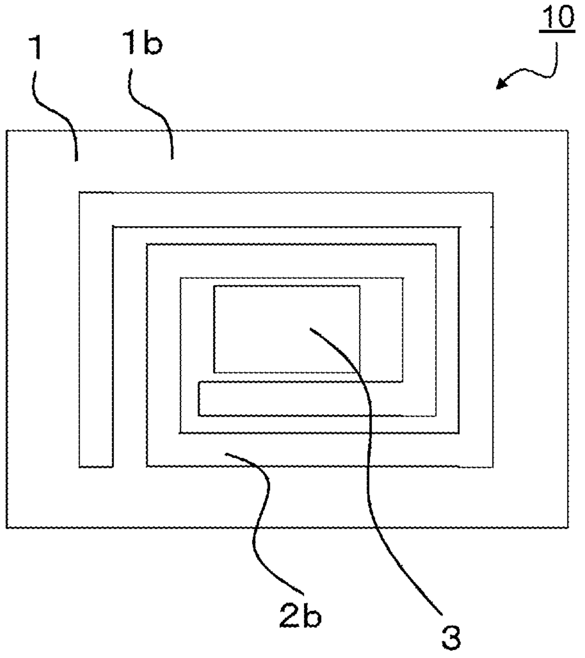
FIG. 6 is a plan view where a planar coil in FIG. 4 is viewed from a side of a second surface thereof.

Furthermore, as illustrated in FIG. 4 to FIG. 6, a planar coil 10 in the present disclosure may further include a second metal layer 2*b* and a connection conductor 6 where the second metal layer 2*b* may be positioned on a second surface 1*b* and a first metal layer 2*a* and the second metal layer 2*b* may be electrically connected through the connection conductor 6. If such a configuration is satisfied, the first metal layer 2*a*, the connection conductor 6, and the second metal layer 2*b* are provided as a single metal layer, so that it is possible to increase a length of a metal layer on a limited surface of a substrate 1.

Herein, the second metal layer 2*b* may have a plurality of voids 9 similarly to the first metal layer 2*a*. Furthermore, the first metal layer 2*a* may have a first metal particle 4*a* and a second metal particle 4*b*. A void 9 may be positioned between the first metal particle 4*a* and the second metal particle 4*b*. Furthermore, a bonding layer 5 as described above may be positioned between the second metal layer 2*b* and the second surface 1*b*.

Furthermore, although it is sufficient that a material that composes the connection conductor 6 is a metal, it may be a metal(s) that is/are identical to that/those of the first metal particle 4*a* and the second metal particle 4*b* that compose the first metal layer 2*a* and the second metal layer 2*b*. Furthermore, the connection conductor 6 may have a plurality of voids 9 similarly to the first metal layer 2*a* and the second metal layer 2*b*. Furthermore, the first metal layer 2*a* may have the first metal particle 4*a* and the second metal particle 4*b*. The void 9 may be positioned between the first metal particle 4*a* and the second metal particle 4*b*.

Additionally, although the connection conductor 6 may be of any shape, a diameter thereof may be 0.3 mm or greater and 2 mm or less if it is of a circularly cylindrical shape. Furthermore, although it is sufficient that a number of a connection conductor(s) 6 is one or more, a number of the connection conductor(s) 6 may be increased depending on a magnitude of an electric current that is used.

Furthermore, FIG. 5 illustrates an example where the connection conductor 6 is positioned in an inside of the substrate 1, and if such a configuration is provided, the connection conductor 6 is free from a risk of being damaged in a case where a plurality of planar coils 10 are laminated so as to provide a laminated coil.

Figure 7:
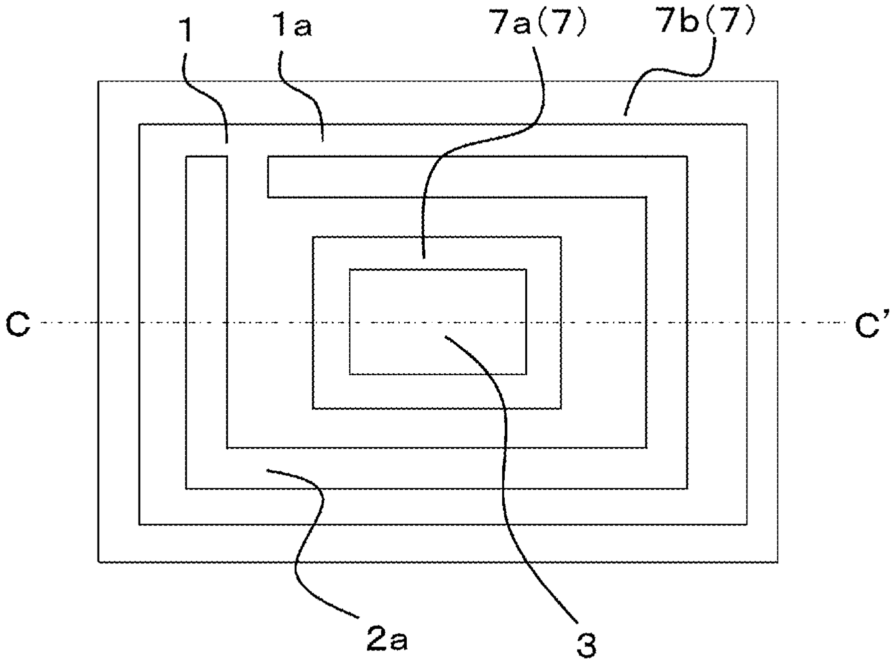
FIG. 7 is a plan view where another example of a planar coil in the present disclosure is viewed from a side of a first surface thereof.
Figure 8:
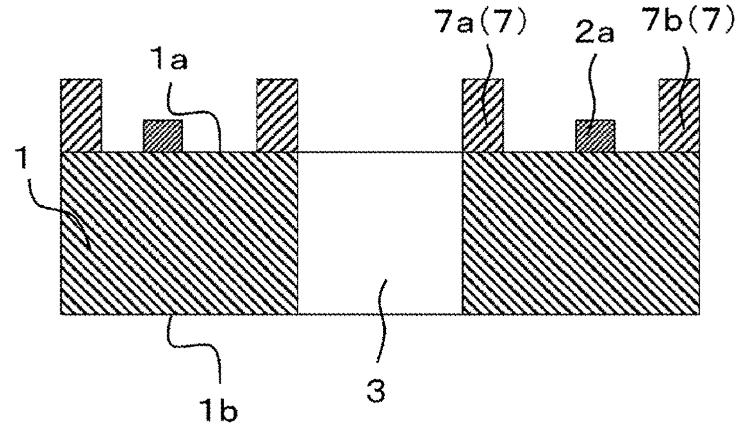
FIG. 8 is an example of a cross-sectional view of FIG. 7 along line C-C' therein.

Furthermore, as illustrated in FIG. 7 and FIG. 8, a substrate 1 in a planar coil 10 in the present disclosure may have a protrusion part 7 that protrudes from a first surface 1*a*. Herein, as illustrated in FIG. 7, a height of the protrusion part 7 is greater than a height of a first metal layer 2*a*. If such a configuration is satisfied, the protrusion part 7 contacts a substrate 1 of another laminated planar coil 10 in a case where a plurality of planar coils 10 are laminated so as to provide a laminated coil, so that it is possible to execute lamination thereof without damaging the first metal layer 2*a*.

Additionally, the substrate 1 may have a protrusion part 7 that protrudes from a second surface 1*b* in a case where a second metal layer 2*b* is present.

Furthermore, as illustrated in FIG. 7, the protrusion part 7 in the planar coil 10 in the present disclosure may be positioned around the first metal layer 2*a* that is positioned on the first surface 1*a*. Herein, FIG. 7 illustrates an example where the substrate 1 has a protrusion part 7*a* and a protrusion part 7*b* that are of a frame shapes in a plan view thereof and the first metal layer 2*a* is positioned in a region that is surrounded by such a protrusion part 7*a* and a protrusion part 7*b*. If such a configuration is satisfied, it is possible to laminate the plurality of planar coils 10 stably without damaging the first metal layer 2*a*.

Figure 9:
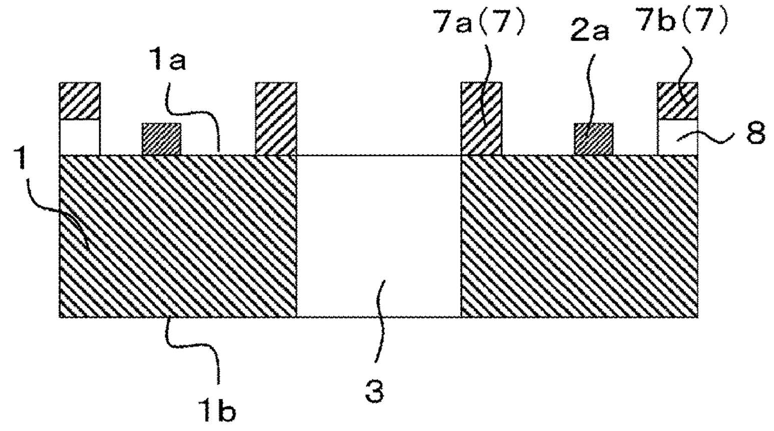
FIG. 9 is another example of a cross-sectional view of FIG. 7 along line C-C' therein.

Furthermore, as illustrated in FIG. 9, a protrusion part 7 in a planar coil 10 in the present disclosure may have a hole 8 that penetrates the protrusion part 7 in a thickness direction thereof. If such a configuration is satisfied, it is possible to pour a gas through a hole of the protrusion part 7, so that it is possible to readily cool a first metal layer 2*a*.

Figure 12A:
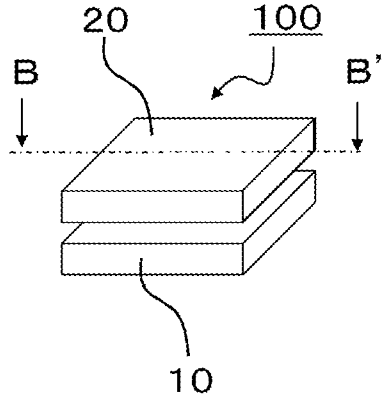
FIG. 12A is a perspective view of a transformer in the present disclosure.
Figure 12B:
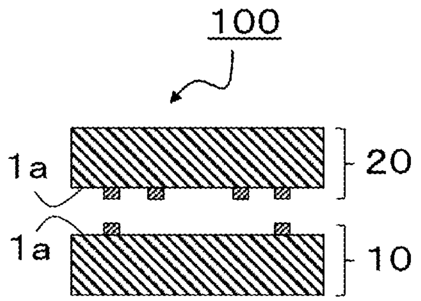
FIG. 12B is a cross-sectional view of FIG. 12A along line B-B' therein.
Figure 12C:
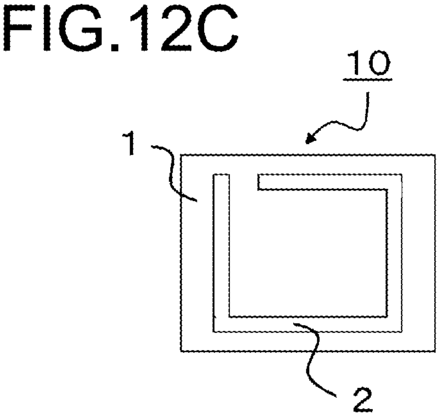
FIG. 12C and FIG. 12D are plan views where a first surface of a planar coil is viewed.
Figure 12D:
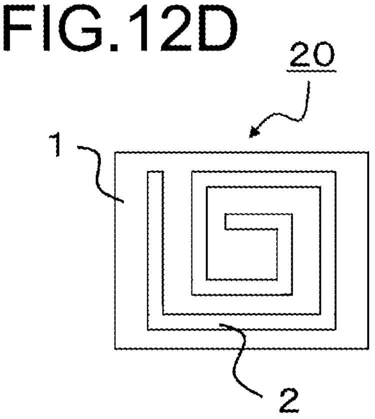

Furthermore, as illustrated in FIGS. 12A, FIG. 12B, FIG. 12C, and FIG. 12D, a planar coil 10 in the present disclosure may be included in a transformer 100. The transformer 100 includes one or more planar coils 10 on an electric power supply side or an electric power receipt side thereof, and an electric current(s) flow(s) through a first metal layer(s) 2*a*, so that it is possible to provide the transformer 100 that converts an electric voltage. As illustrated in FIG. 12A and FIG. 12B, the transformer 100 may include the planar coil 10 on an electric power supply side thereof. Furthermore, the transformer 100 may include a planar coil 20 on an electric power receipt side thereof. An external electric power source is connected to the planar coil 10 and an electric current flows through a first metal layer 2*a*, so that electromagnetic induction is caused. Hence, an electric current flows through a first metal layer 2*a* of the planar coil 20. As illustrated in FIG. 12C and FIG. 12D, a number of a turn(s) of the first metal layer 2*a* in the planar coil 10 may be different from a number of a turn(s) of the first metal layer 2*a* in the planar coil 20. Numbers of a turn(s) of the planar coil 10 and the planar coil 20 are adjusted, so that it is possible to change an electric voltage.

Figure 13A:
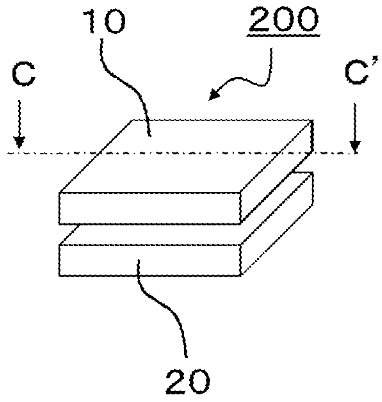
FIG. 13A is a perspective view of a wireless electric power transmission device in the present disclosure.
Figure 13B:
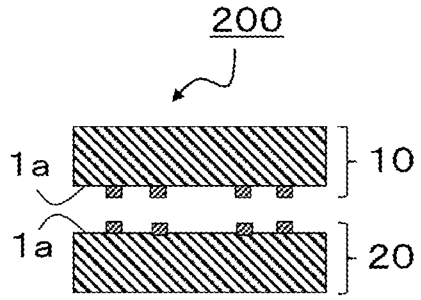
FIG. 13B is a cross-sectional view of FIG. 13A along line C-C' therein.
Figure 13C:
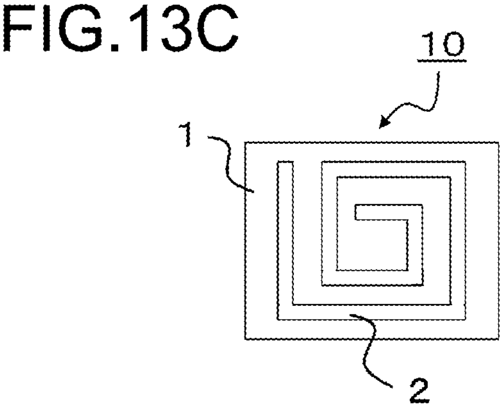
FIG. 13C is a plan view where a first surface of a planar coil is viewed.

Furthermore, as illustrated in FIGS. 13A, FIG. 13B, and FIG. 13C, a planar coil 10 in the present disclosure may be included in a wireless electric power transmission device 200. The wireless electric power transmission device 200 may include one or more planar coils 10 on an electric power supply side or an electric power receipt side thereof. In such a case, an electric current(s) flow(s) through a first metal layer(s) 2*a*, so that it is possible to transmit an electric power. Hence, it is possible to use the planar coil 10 and a planar coil 20 in the present disclosure as the wireless electric power transmission device 200. The wireless electric power transmission device 200 in FIG. 13A and FIG. 13B may include the planar coil 10 on an electric power supply side thereof and the planar coil 20 on an electric power receipt side thereof. An external electric power source is connected to the planar coil 10 and an electric current flows through a first metal layer 2*a*, so that electromagnetic induction is caused. Hence, an electric current flows through the first metal layer 2*a* of the planar coil 20. Thus, it is possible to use the planar coil 20 in the present disclosure as the wireless electric power transmission device 200 that executes delivery of an electric power.

Figure 14:
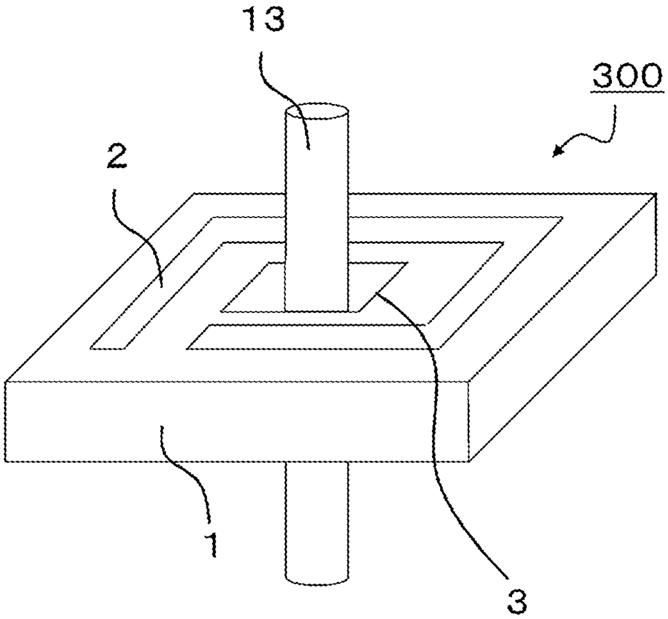
FIG. 14 is a perspective view of an electromagnet in the present disclosure.

Furthermore, as illustrated in FIG. 14, a planar coil 10 in the present disclosure may be included in an electromagnet 300. The electromagnet 300 may have a through-hole 3. The electromagnet 300 may have a magnetic core 13 in the though-hole 3. The electromagnet 300 includes one or more planar coils 10 and an electric current(s) flow(s) through a first metal layer(s) 2*a*, so that magnetic force is generated at the magnetic core 13. Hence, it is possible to use the planar coil 10 in the present disclosure as an electromagnet. Additionally, it is sufficient that a material of a magnetic core is a magnetic material, and it is possible to provide, for example, ferrite, iron, ferrosilicon, an iron-nickel-based alloy, and an iron-cobalt-based alloy. For an example of an iron-nickel-based alloy, it is possible to provide permalloy. Furthermore, for an example of an iron-cobalt-based alloy, it is possible to provide permendur.

Next, an example of a manufacturing method for a planar coil in the present disclosure will be explained.

First, a sintering aid, a binder, a solvent, and the like are added and appropriately mixed to a powder of a raw material (such as aluminum oxide or silicon nitride) that is provided as a main component so as to fabricate a slurry. Then, a green sheet is formed by using such a slurry according to a doctor blade method and punching by a die and/or laser processing is applied thereto, so as to provide a green sheet with a desired shape. Alternatively, such a slurry is sprayed and dried so as to obtain a granulated granule. Subsequently, such a granule is rolled so as to form a green sheet and punching by a die and/or laser processing is applied thereto, so as to provide a green sheet with a desired shape.

Herein, when punching by a die and/or laser processing is applied thereto, a hole or the like that is provided as a flow channel may be formed in a green sheet.

Then, a plurality of green sheets are laminated so as to obtain a molded body. Herein, a flow channel may be formed or a site that is provided as a protrusion part may be formed. Furthermore, a metal paste that is provided as a connection conductor may be embedded in a molded body.

Then, such a molded body is fired so as to obtain a substrate that is composed of a ceramic(s) and has a first surface.

Then, a first metal layer is formed on a first surface of a substrate. First, a mask with a desired shape that is composed of a porous resin is formed on a first surface. Then, for example, a mixed liquid where a plurality of metal particles that include a first metal particle and a second metal particle that are composed of a stainless one or copper are mixed to a liquid such as water is prepared and is poured into a space that is formed by such a mask. Then, a mixed liquid is dried so as to vaporize a liquid. Subsequently, after a mask is eliminated by burning thereof or use of a solvent and pressurization thereof is executed at a predetermined pressure, a substrate is heated or ultrasonic vibration is applied thereto. Thereby, it is possible to weld a first metal particle and a second metal particle. Thereby, a first metal layer that has a void is obtained. Furthermore, it is possible to form a weld part between a first metal particle and a third metal particle.

Additionally, a bonding layer may first be formed on a first surface of a substrate and a first metal layer may subsequently be formed on such a bonding layer, without directly forming the first metal layer on the first surface. Herein, a bonding layer is of a resin, a metal, a glass, or a porous ceramic(s). In a case where a bonding layer is of a metal, it is sufficient that formation thereof is executed by using a sputtering method after formation of a mask as described above or formation thereof is executed by an electroless plating method and/or a metallization method. On the other hand, in a case where a bonding layer is of a resin, a glass, or a porous ceramic(s), it is sufficient that the bonding layer is formed before formation of a mask as described above. In such a case, it is sufficient that a resin, a glass, or a porous ceramic(s) is/are formed by applying a paste that is provided with it as a main component thereof to a first surface and executing heat treatment thereof. Furthermore, a resin, a glass, or a porous ceramic(s) is/are of an insulation property, so that formation thereof may be executed so as to cover a whole of a first surface of a substrate. Additionally, if a porous ceramic(s) is/are a component(s) that is/are identical to a ceramic(s) that compose(s) a substrate, it/they is/are readily bonded to the substrate.

Then, if a bonding layer is of a resin, a metal, or a glass, a first metal layer is formed on the bonding layer and subsequently a substrate is heated, so that the bonding layer is wetted and thereby bonded to the first metal layer. Furthermore, if a bonding layer is of a porous ceramic(s), a metal particle that composes a first metal layer penetrates into the porous ceramic(s) so as to attain bonding thereof. Additionally, if a bonding layer is of a metal, an electric current flows through the bonding layer and a first metal layer so as to bond a metal of the bonding layer and a metal particle that composes the first metal layer, so that it is also possible to bond the bonding layer and the first metal layer.

Additionally, a substrate that has a first metal layer may be obtained by preparing the first metal layer separately and mounting the first metal layer on a bonding layer that is preliminarily formed on a first surface, or applying a paste that is provided as a bonding layer to the first metal layer, subsequently mounting it on a first surface, and heating the substrate. In such a case, a first metal layer is preliminarily fabricated by an undermentioned method. First, for example, a mixed liquid where a plurality of metal particles that are composed of a stainless one or copper are mixed to a liquid such as water is prepared, and is poured into a mold that is provided with a shape of a first metal layer. Then, this is dried so as to vaporize a liquid. Then, pressurization thereof is executed at a predetermined pressure and heating thereof is executed, or ultrasonic vibration is applied, so that a first metal particle and a second metal particle are bonded. Then, if removal thereof from a mold is executed, a first metal layer is obtained where a plurality of metal particles that include a first metal particle and a second metal particle are bonded and it has a void.

Additionally, a first metal layer may be fabricated by an undermentioned method. First, a plurality of metal particles that include a first metal particle and a second metal particle and a binder are mixed, and subsequently, a molded body is fabricated by a mechanical press method. Then, such a molded body is dried so as to vaporize a binder. Subsequently, heating thereof is executed or ultrasonic vibration is applied thereto. Thereby, it is possible to weld a plurality of metal particles that include a first metal particle and a second metal particle together. Thereby, it is possible to form a weld part between a first metal particle and a third metal particle. Thereby, a first metal layer that has a void is obtained.

Furthermore, a second metal layer may be formed on a second surface of a substrate by a method that is identical to that of a first metal layer as described above.

Additionally, the present disclosure is not limited to an embodiment(s) as described above and a variety of modifications, improvements, and/or the like are possible without departing from an essence of the present disclosure.

REFERENCE SIGNS LIST

1: substrate
1*a*: first surface
1*b*: second surface
2*a*: first metal layer
2*b*: second metal layer
3: through-hole
4*a*: first metal particle
4*b*: second metal particle
4*c*: third metal particle
5: bonding layer
6: connection conductor
7: protrusion part
8: hole
9: void
10: planar coil
11: flow channel
12: weld part
13: magnetic core

The invention claimed is:

1. A planar coil, comprising:

a substrate that is composed of a ceramic(s) and includes a first surface; and a first metal layer that is positioned on the first surface and includes a void, wherein the first metal layer includes a first metal particle and a second metal particle, the void is positioned between the first metal particle and the second metal particle, the first metal layer further includes a third metal particle, and the first metal layer includes a weld part between the first metal particle and the third metal particle.

2. The planar coil according to claim 1, further comprising a bonding layer that is positioned between the first metal layer and the first surface.

3. The planar coil according to claim 2, wherein the bonding layer is composed of a material that is selected from a resin, a metal, and a glass.

4. The planar coil according to claim 2, wherein the bonding layer is composed of a porous ceramic(s).

5. The planar coil according to claim 1, wherein the substrate includes a flow channel in an inside thereof.

6. The planar coil according to claim 1, further comprising a second metal layer and a connection conductor, wherein:

the substrate includes a second surface that is opposite to the first surface, the second metal layer is positioned on the second surface, and the first metal layer and the second metal layer are electrically connected through the connection conductor.

7. The planar coil according to claim 1, wherein the substrate includes a protrusion part that protrudes from the first surface, and a height of the protrusion part is greater than a height of the first metal layer.

8. The planar coil according to claim 7, wherein the protrusion part is positioned around the first metal layer that is positioned on the first surface.

9. A transformer, comprising the planar coil according to claim 1.

10. A wireless electric power transmission device, comprising the planar coil according to claim 1.

11. An electromagnet, comprising the planar coil according to claim 1.

12. The planar coil according to claim 1, wherein the protrusion part includes a hole that penetrates the protrusion part in a thickness direction thereof.

13. The planar coil according to claim 7, wherein A planar coil, comprising:

a substrate that is composed of a ceramic(s) and includes a first surface; and a first metal layer that is positioned on the first surface and includes a void, wherein the substrate includes a protrusion part that protrudes from the first surface, a height of the protrusion part is greater than a height of the first metal layer, and the protrusion part includes a hole that penetrates the protrusion part in a thickness direction thereof.

14. A transformer, comprising the planar coil according to claim 13.

15. A wireless electric power transmission device, comprising the planar coil according to claim 13.

16. An electromagnet, comprising the planar coil according to claim 13.

* * * * *